US008667622B2

(12) United States Patent
Truman et al.

(10) Patent No.: US 8,667,622 B2
(45) Date of Patent: Mar. 11, 2014

(54) HYDROTHERAPY APPARATUS

(75) Inventors: Christopher John Truman, Telford (GB); Matthew William Rees, Broseley (GB)

(73) Assignee: Syspal Limited, Broseley, Shropshire (GB)

( * ) Notice: Subject to any disclaimer, the term of this patent is extended or adjusted under 35 U.S.C. 154(b) by 1359 days.

(21) Appl. No.: 11/815,951

(22) PCT Filed: Feb. 9, 2006

(86) PCT No.: PCT/GB2006/000450
§ 371 (c)(1),
(2), (4) Date: Mar. 26, 2008

(87) PCT Pub. No.: WO2006/085077
PCT Pub. Date: Aug. 17, 2006

(65) Prior Publication Data
US 2008/0271236 A1 Nov. 6, 2008

(30) Foreign Application Priority Data

Feb. 9, 2005 (GB) .................................. 0502622.4

(51) Int. Cl.
*A47K 3/02* (2006.01)
(52) U.S. Cl.
USPC .................................... 4/556; 4/557; 292/114
(58) Field of Classification Search
USPC .................. 4/556, 559, 580, 661, 581, 498, 4/541.1–541.5; 292/110, 114, 297, 298, 292/338, 342, 207, 111, 241, DIG. 12
See application file for complete search history.

(56) References Cited

U.S. PATENT DOCUMENTS

| 403,391 | A | * | 5/1889 | Smith | ........................... 292/111 |
| 2,611,341 | A | | 9/1952 | Paris | |
| 3,060,892 | A | | 10/1962 | Schantz | |
| 3,133,292 | A | * | 5/1964 | Spier | ................................. 4/580 |
| 3,485,213 | A | | 12/1969 | Scanlon | |
| 3,719,960 | A | * | 3/1973 | Russell | ............................. 4/556 |

(Continued)

FOREIGN PATENT DOCUMENTS

| DE | 10001878 | 12/2001 |
| DE | 10001878 A1 | 12/2001 |

(Continued)

OTHER PUBLICATIONS http://web.archive.org/web/*sa_http://www.fernovetsystems.com (six (6) pages).

(Continued)

*Primary Examiner* — Len Tran
*Assistant Examiner* — Viet Le
(74) *Attorney, Agent, or Firm* — Boyle Fredrickson, S.C.

(57) ABSTRACT

A hydrotherapy apparatus 2 comprising at least one door 12, affixed thereto, operable between an open condition in which access is provided to an interior of the apparatus 2 and a closed condition in which access is prevented to an interior of the apparatus, wherein the apparatus 2 is provided with a door closing mechanism having a first engagement condition and a second engagement condition wherein movement of the mechanism from the first engagement condition to the second is arranged to draw the door 12 against a frame 352 to which it abuts.

22 Claims, 9 Drawing Sheets

(56) References Cited

U.S. PATENT DOCUMENTS

| | | | |
|---|---|---|---|
| 4,332,217 A | 6/1982 | Davis | |
| 4,379,438 A | 4/1983 | Peardon | |
| 4,546,506 A | 10/1985 | Houle et al. | |
| 4,551,108 A | 11/1985 | Bass | |
| 4,776,581 A | 10/1988 | Shepherdson | |
| 4,918,766 A | 4/1990 | Leonaggeo | |
| 4,938,469 A | 7/1990 | Crandell | |
| 4,944,506 A * | 7/1990 | Keller et al. | 482/54 |
| 4,953,241 A * | 9/1990 | Williams | 4/556 |
| 5,042,855 A * | 8/1991 | Bennett et al. | 292/241 |
| 5,100,127 A * | 3/1992 | Melnick et al. | 119/700 |
| 5,379,467 A | 1/1995 | Lochbaum | |
| 6,746,375 B2 * | 6/2004 | Smith et al. | 482/54 |

FOREIGN PATENT DOCUMENTS

| | | |
|---|---|---|
| DE | 20313036 | 11/2003 |
| DE | 20313036 U1 | 11/2003 |
| EP | 0103263 | 3/1984 |
| FR | 2748664 | 11/1997 |
| GB | 2200548 | 8/1988 |
| GB | 2349333 | 11/2000 |
| GB | 2378139 | 2/2003 |
| GB | 2379605 | 3/2003 |
| IT | NA2003A000022 | 4/2003 |
| JP | 07-275314 | 10/1995 |
| JP | 08019582 A | 1/1996 |
| JP | 07275314 | 2/1996 |
| JP | 08131502 A | 5/1996 |
| JP | 08322898 A | 12/1996 |
| JP | 09066089 A | 3/1997 |
| JP | 11221168 A | 8/1999 |
| JP | 2002017889 | 1/2002 |
| JP | 2002177351 | 6/2002 |
| WO | WO8806049 | 8/1988 |
| WO | WO9101162 | 2/1991 |
| WO | WO0035324 | 6/2000 |

OTHER PUBLICATIONS

European Patent Office Action dated Sep. 27, 2012 and Written Opinion; Application No. 06 709 688.3; (6 pages).

International Search Report and Written Opinion, PCT/US2005/016225, Dec. 28, 2005.

* cited by examiner

B-B 2 Places

Fig. 10

E-E 2 Places

Fig. 8

C-C 2 Places

D-D 2 Places

Fig. 13

| CLOSE DOOR LATCH PLATE FORCES TUBE DOWN | LATCH TUBE COMPRESSES SPRING | LATCH PLATE LOCATED IN CAM IN LATCH TUBE |

HYDROTHERAPY APPARATUS

This application is a National Phase Application under 35 U.S.C. 371 of PCT Application No. PCT/GB2006/000450 filed on Feb. 9, 2006, which claims priority to GB 0502622.4 filed on Feb. 9, 2005, the entireties of which are expressly incorporated herein.

FIELD OF INVENTION

This invention relates to a hydrotherapy apparatus and related methods. In particular, but not exclusively, the invention relates to a hydrotherapy apparatus suitable for use by animals, and in particular domestic animals, although other apparatus, such as for human, equine or livestock use, may also be envisaged.

BACKGROUND TO THE INVENTION

Although the invention has wider applicability it is convenient to discuss the invention in relation to animals and such reference to animals hereinafter should not be taken to be limiting to animals. Further, in the art it is common to refer to the human or animal being treated in the hydrotherapy apparatus as a patient and reference to patient herein is intended to refer to humans or animals.

It is known when an animal is convalescing from treatment or surgery, from an injury or condition such as arthritis, or for an animal requiring physiotherapy for the animal to be treated using a hydrotherapy apparatus. Such apparatus are well known and generally consist of a tank, having one or more glass sides, together with a conveyor in a base region of the tank. In use, the tank is filled with a liquid, which is generally heated water, and the animal to be treated placed therein. The liquid gives the animal buoyancy such that its the weight that its legs must bear due to contact with the conveyor is reduced. Thus, the animal can be exercised by movement of the conveyor although the load placed on the legs of the animal is reduced.

Hydrotherapy has benefits for the animal being treated, which include warm water which is well known as improving blood flow and circulation which is important in recovery and can help to reduce recovery time from operations and other conditions. Further, hydrotherapy is suitable for old dogs, or other patients, which may not otherwise be rehabilitated.

However, previous hydrotherapy apparatus have certain disadvantages. For instance it has previously been difficult to allow an animal to enter and exit the apparatus. One particular solution is shown in GB2378139. However, the arrangement shown in this document. of providing a ramp that also functions as a door, prevents a transparent, such as glass, door being provided since a non-slip surface would generally be used on the ramp. Since animals do not generally like being placed into containers from which they cannot see this is generally undesirable. Further, a ramp on the end of the apparatus can be heavy and thus difficult to operate particularly for operators that are smaller in stature. Generally the ramp is operated from outside the equipment making it difficult or impossible for a single operator to use the equipment particularly if the operator needs to assist the patient inside the tank during treatment.

It will be appreciated that, since the apparatus is to be used in a veterinary or other clinical environment, cleanliness of the apparatus is of a concern. As such it is desirable to allow the apparatus to be fully cleaned. It will be appreciated that a conveyor in a bottom region of the apparatus can provide an obstacle to cleaning the bottom surface of the apparatus. Further, it will be appreciated that conveyors are heavy and difficult to move.

It is convenient for a gap to be provided between any conveyor that is provided in the apparatus and a side wall of the apparatus since it is often convenient for the conveyor to be provided as a separate entity to the remainder of the apparatus. The gap is useful in that it allows a doctor or vet, etc. to stand within the apparatus without having to walk/run on the treadmill. However, such a gap provides an animal inside the apparatus with the opportunity of avoiding contact with the conveyor. Such avoidance of contact negates the effect of the apparatus since the animal does not obtain the exercise which they require.

SUMMARY OF THE INVENTION

According to a first aspect of the invention there is provided a hydrotherapy apparatus comprising a tank and floats the floats being arranged, such that when the tank is filled with a liquid, the floats float at a surface region of the liquid adjacent side walls of the tank.

Such an arrangement is advantageous because it helps to keep an animal within the tank away from the side walls of the tank.

The hydrotherapy apparatus may comprise a conveyor. Generally there are gaps between the side walls of the tank and the conveyor and in such an arrangement the floats may be particularly advantageous since an animal within the tank may be prevented from avoiding the conveyor.

Conveniently, the floats are substantially the same length as the tank. However, it will be appreciated that in other embodiments a plurality of floats may be provided along any one wall of the tank, or a float may be provided that occupies only a fraction of the length of a wall of the tank. For example, a float may occupy roughly any of the following non-exhaustive list of fractions of a length of a wall: 0.3, 0.4, 0.5, 0.6, 0.7, 0.8, 0.9.

The floats may be made of any suitable material but would generally comprise a plastics material. The floats may comprise a low density filler covered by a tougher outer material.

The floats may be of any suitable cross section although in perhaps the preferred embodiment the floats are roughly circular in cross section.

The floats may be attached to the tank and such an arrangement is convenient because it prevents the floats from moving around inside the tank. The floats may be attached to the tank by means of a tether. In alternative, or additional embodiment, engagement means on a float may co-operate with engagement means on one or more walls of the tank. The engagement means may comprise one or more channels on one or more walls of the tank.

At least one float may be provided in a region of an end wall of the tank.

According to a second aspect of the invention there is provided a hydrotherapy apparatus float arranged to be used in a hydrotherapy apparatus according to the first aspect of the invention.

According to a third aspect of the invention there is provided a hydrotherapy apparatus having a least one door operable between an open condition in which access is provided to an interior of the apparatus and a closed condition in which access is prevented to an interior of the apparatus, wherein the apparatus is provided with a door closing mechanism having a first engagement condition and a second engagement condition wherein movement of the mechanism from the first engagement condition to the second is arranged to draw the door against a frame to which it abuts.

Such an arrangement is convenient because it helps to ensure that there is a watertight seal between the door and the frame.

Conveniently, the mechanism comprises a tubular member having one or more slots therein. In a preferred embodiment the tubular member is circular in cross section. Such an arrangement is convenient since it provides a mechanically simple arrangement.

Generally, the tubular member is arranged such that rotation thereof moves the mechanism from the first engagement condition to the second engagement condition. However, in alternative, or additional, embodiments movement of the tubular member along or transverse to the longitudinal axis of the tubular member.

A handle may be provided, which is conveniently pivotally attached, to the tubular member. In a preferred embodiment the handle is arranged to present itself in a first condition when the mechanism is in the first condition and to present itself in a second condition when the mechanism is in the second condition.

The door closing mechanism may be provided with a cam arranged to draw the door closed as, in use, the mechanism is moved from the first engagement condition to the second engagement condition. The cam may comprise an off-centre hole in a plate which is preferably arranged to receive a protrusion on a catch of the door. The hole may be circular.

In a preferred embodiment the cam is arranged to rotate as the mechanism moves from the first engagement condition to the second engagement condition. Rotation of the tubular member may cause the cam to rotate. Indeed, the tubular member and the cam may have a fixed orientation relative to one another.

Preferably a resilient material is provided between the door and the frame to which it abuts. Such a resilient material is beneficial since it helps to provide a watertight seal. Generally the resilient material is arranged such that it is compressed by the door as the mechanism moves from the first engagement condition to the second engagement condition.

The mechanism is preferably arranged to latch a latch on the door in the first engagement condition. Further, the mechanism is preferably arranged to lock a latch on the door within the mechanism when in the second engagement condition.

The or each door may comprise a transparent region, which may be glass. Such a glass region is advantageous since it allows a user of the apparatus to view the animal/patient being treated inside the apparatus and also allows the animal to see out more. Some animals do not like to being within a confined box and providing further visibility for such animals can be an advantage. If a door is provided at each end of the apparatus, each with a transparent region, it may be possible to provide substantially a glass walled apparatus. Perspex or other transparent material could also be used as the transparent region.

According to a fourth aspect of the invention there is provided with a hydrotherapy apparatus comprising a tank having a conveyor therein, a conveyor moving means and remote control arranged to operate the conveyor moving means.

It is common for a career to be present in the tank with an animal to provide the animal with assistance. However, when a career is present in the tank it has previously been difficult for him/her to operate the conveyor and it is therefore an advantage of the apparatus according to the invention that the career can more readily control the apparatus.

The remote control may operate the conveyor moving means via a wired and/or a wireless link. A wireless link is advantageous since it provides a greater degree of flexibility although the remote can be mislaid. Conversely, a wired link is perhaps less convenient due to the presence of the wire but does provide a remote that is harder to misplace.

It will be appreciated that in use, the apparatus will be filled with a liquid, which is generally water, which provides a hostile environment for electronic devices. Thus, it is convenient that the remote is either waterproof and/or covered with a water-proofing means such that contact with the liquid in the tank does not harm the remote. The water-proofing means may comprise a sealable bag. It is convenient for at least a portion of such a bag to be substantially transparent to allow a user to view the remote inside the bag.

The remote may be arranged such that it can control any of the following, non-exhaustive list of actions: the speed of the conveyor (plus and/or minus), start of the conveyor, stopping of the conveyor, inclination of the conveyor about an axis substantially transverse to its longitudinal axis, inclination of the conveyor about an axis substantially parallel, or along, its longitudinal axis, the level of the liquid within the apparatus (i.e. it may allow the level to be increased and/or decreased). The remote is advantageous since it can be used to give the operator (generally a vet or doctor) full control of the apparatus which is likely to improve its safety.

Preferably, the remote is connected to a controller which in turn is connected to the conveyor moving means.

Inclination of the conveyor (whether inclination of the conveyor about an axis substantially transverse to its longitudinal axis or substantially parallel, or along, its longitudinal axis) may be by movement of the conveyor or alternatively/additionally may be by movement of the apparatus as a whole.

The controller may be provided as part of the apparatus. Alternatively, or additionally, the controller may be remote from the apparatus and connected to the apparatus.

According to a fifth aspect of the invention there is provided a hydrotherapy apparatus comprising a tank having a conveyor therein, wherein the conveyor has a working position in which its surface is substantially horizontal or inclined about an axis generally transverse its longitudinal axis, and an access position in which it is inclined about an axis that is generally parallel to its longitudinal axis.

Such an arrangement is convenient because whilst the conveyor is in the access position it can be easier to clean the underside of the conveyor and the bottom of the tanks which is desirable for reasons of hygiene. It is further advantageous because, as will be appreciated by the skilled person, conveyors are weighty and can weigh several tens of kilograms, and as such is convenient to incline the conveyor about an axis that is generally parallel to its longitudinal axis since this involves the movement of the centre of mass over a shorter distance than prior art mechanisms. It is also convenient to allow a user to perform maintenance, such as belt tracking adjustment, belt changing, etc. on the conveyor.

Conveniently, a conveyor support means is provided that is capable of moving the conveyor between the working and the access positions. Such a means is advantageous because it facilitates movement of the conveyor, which can of course weigh substantial amounts.

The conveyor support means may comprise one or more pistons/rams arranged to extend to move the conveyor between the working and access positions. The pistons/rams may be fluid operated such as hydraulic or pneumatic. However, the in perhaps the preferred embodiment the conveyor support means comprises one or more gas filled struts arranged to assist a user rather than being arranged to move the conveyor without additional power (such as provided by a user).

In alternative, or additional, embodiments the conveyor support means may comprise a screw which is arranged to rotate in order to move the conveyor between the working and access positions.

In perhaps the preferred embodiment a conveyor support means is provided at each end region of the conveyor.

In the preferred embodiment the conveyor is provided on a frame which can be removed from the apparatus together with the conveyor. Such an arrangement is convenient because it allows more minor repairs/adjustments to be carried out in situ, whereas more extensive maintenance could be performed with the conveyor and frame removed from the apparatus.

The conveyor may be arranged such that it cannot operate when it is in the access position. In some embodiments, the conveyor may be arranged such that it cannot operate when it is not in the working position. It will be appreciated that the working position may include inclining the conveyor about an axis generally transverse its longitudinal axis since it could be desirable to make an animal in the apparatus walk up and/or down hill in order to increase the intensity of exercise. Inclining the conveyor about an axis generally transverse its longitudinal axis may be performed by inclining either the conveyor and/or the conveyor, apparatus combination.

The liquid, which is generally water may be heated. A liquid containing vessel may be provided in association with the apparatus and arranged to supply a volume of liquid to the apparatus. Heating and/or cleaning means may be provided with the liquid containing vessel in order that the liquid within the apparatus is respectively at the required temperature or is clean.

The cleaning means may be any suitable mechanism but may comprise at least one of the following: a supply of chemicals; U.V. filters; or the like.

Conveniently, the liquid containing vessel is insulated in order to reduce the heat input required to maintain the liquid at the desired temperature.

According to a sixth aspect of the invention there is provided a hydrotherapy system comprising a hydrotherapy apparatus arranged, in use, to hold a volume of liquid, and the system further comprising a one or more of the following accessories which are adapted, in use, to be received within the hydrotherapy apparatus: a chair, an exercise bicycle, a treadmill, one or more jet apparatus.

The advantage of such a system is that it can provide an apparatus which is flexible and more versatile. Hydrotherapy apparatus may be a bulky piece of apparatus and as such a premise may only be able to fit in a single piece of apparatus. Further, such an apparatus may be expensive and a premise may only be able to afford a single piece of apparatus. Therefore, a system according to the sixth aspect of the invention may be able to provide a flexible system that allows a single piece of apparatus to provide a plurality of functions.

The jet apparatus may be arranged to cause the apparatus to function as a Jacuzzi, whirlpool, or the like.

The hydrotherapy apparatus may be according to any of the above aspects of the invention.

The apparatus may comprise an engagement means arranged to engage any one of the accessories. Such an engagement means is convenient because it provides a positive engagement for the accessory that may make the accessory safer and more convenient to use.

The engagement means may comprise provided on the apparatus may engage a complimentary means on the accessory.

The engagement means may comprise a locking means arranged to lock the accessory in place. Such a locking means can further increase the security of the location of the accessory within the apparatus.

The skilled person will appreciate that many of the features discussed above in relation to any of the aspects of the invention are suitable for other of the aspects of the invention and the association of one feature with an aspect of the invention does not necessarily tie that feature to that aspect of the invention.

BRIEF DESCRIPTION OF THE DRAWINGS

There now follows by way of example only a detailed description of embodiments of the invention with reference to the accompanying drawings of which.

DETAILED DESCRIPTION OF THE DRAWINGS

Figure 1:
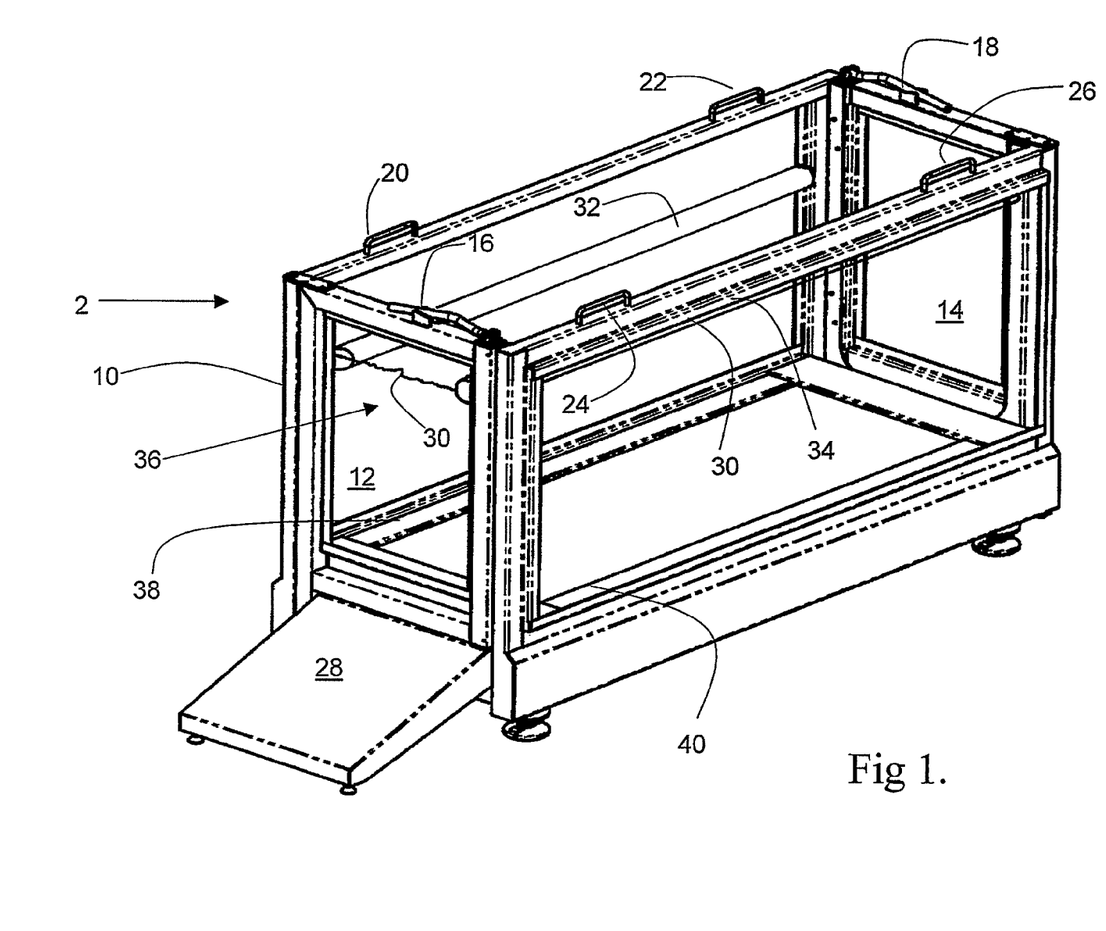
FIG. 1 shows a schematic drawing of a hydrotherapy apparatus according to an aspect of the invention.

FIG. 1 shows a hydrotherapy apparatus 2 comprising a tank 10 having four substantially transparent sides. The tank 10 is rectangular in plan view and comprises a first 12 and a second 14 door at each of the minor ends of the tank 10. Each of the doors 12,14 has associated therewith a handle 16, 18 which operates a door closing mechanism as detailed below.

Four grab handles 20, 22, 24, 26 are provided around the top-most periphery of the tank 10 at convenient locations for a user to grab and/or as an anchorage point to which a harness or the like can be attached.

A ramp 28 is provided such that an animal or human (hereinafter referred to as an animal) may easily enter the tank 10. Although not shown a similar ramp is provided at the opposite end of the tank such that an animal may exit the tank 10. Having a door at both ends of the tank is advantageous since is allows an animal to enter and exit the tank without having to turn round.

In the closed position, as shown in FIG. 1, each of the doors 12, 14 form a water tight seal with the body of the tank and the tank is, in use, filled with a liquid. Generally this liquid will be water. The tank in FIG. 1 is shown in a filled condition with the water level 30 indicated through the transparent sides of the tank 10.

FIG. 1 shows two floats 32, 34, which in this embodiment are generally circular in cross section, which float at a surface region of the water adjacent side walls of the tank and extend for substantially the entire length of the major walls of the tank 10. A space 36 exists between the two floats 32, 34 which is wide enough for an animal to be placed therein. The floats help to keep the animal away from the walls of the tank 10 which is particularly advantageous if there are spaces between the a conveyor and the major walls of the tank. In this embodiment platforms 38, 40 covered in a non-slip surface are provided in order that a career of the animal/patient can stand in the apparatus with the conveyor operating. However, the floats 32, 34 help to ensure that the animal/patient uses the conveyor.

Figure 4:
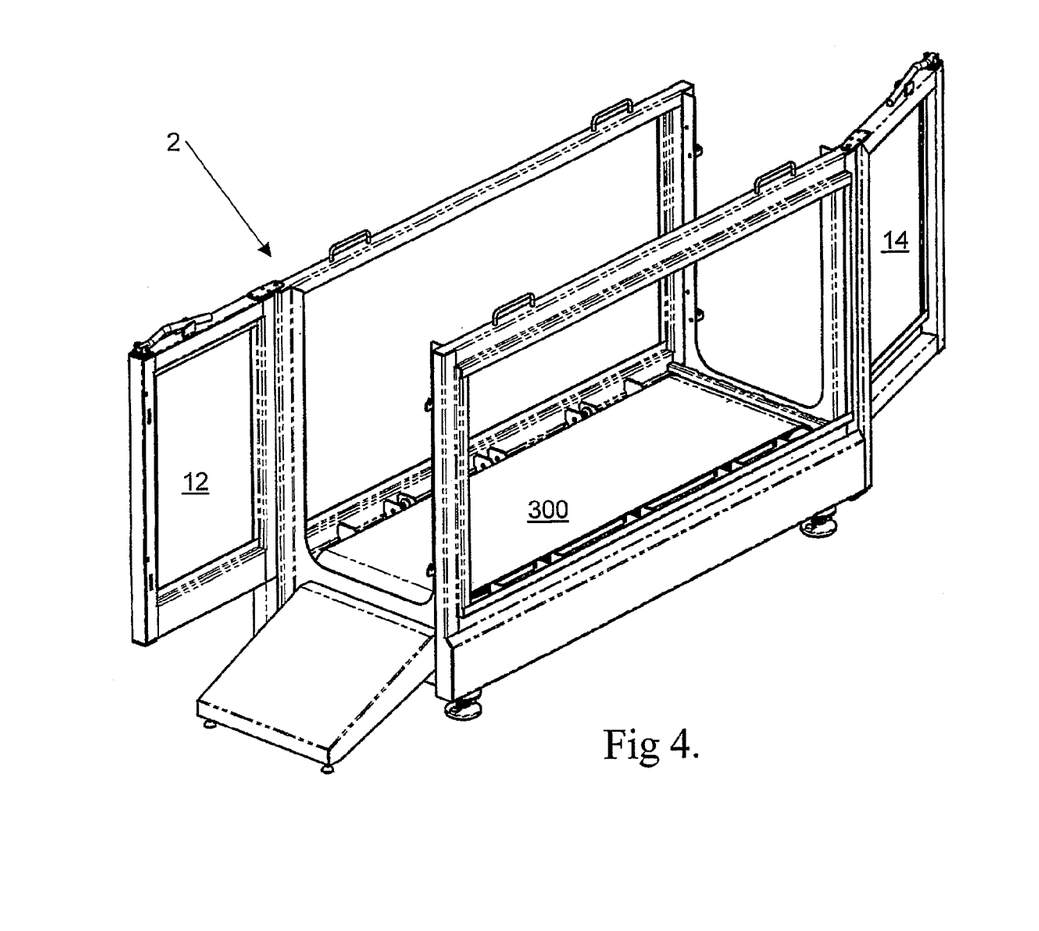
FIG. 4 shows an embodiment of the invention having a conveyor in a working position with the doors of the apparatus in an open condition.

FIG. 4 shows a further embodiment of a hydrotherapy apparatus, similar to that shown in FIG. 1 and like parts are referred to with the same reference numerals. In this Figure the two doors 12, 14 are shown in an open position which provides access to the interior of the tank. The belt 300 of a conveyor 400 is also shown. In this Figure the conveyor is shown in a working position in which an animal can exercise upon the belt 300 of the conveyor 400 and in which the surface of the belt 300 is substantially horizontal (or may be inclined about an axis generally transverse its longitudinal axis if the animal is to be made to walk up or down hill).

Figure 5:
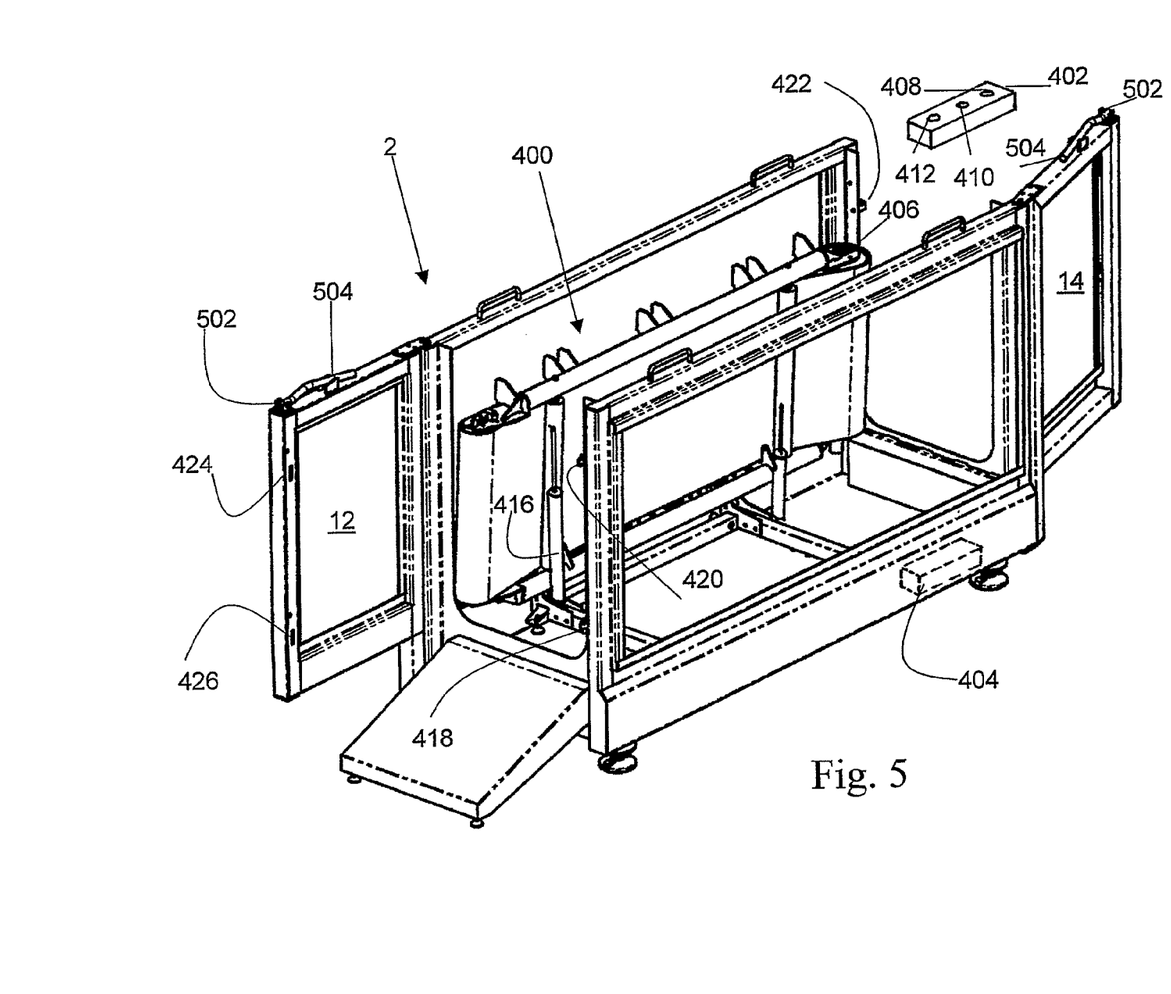
FIG. 5 shows the embodiment of the invention of FIG. 4 having a conveyor in an access position.
Figure 6A:
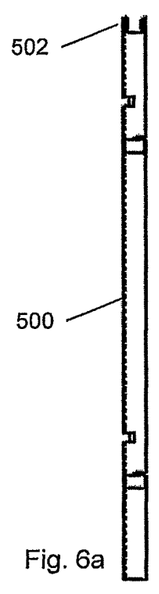
FIGS. 6a to 6d shows views of an element of a door closing mechanism.
Figures 6B, 6C:
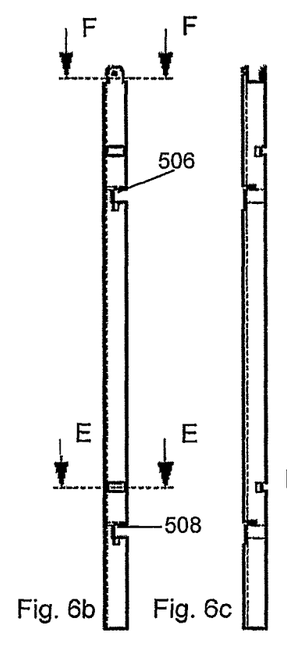
Figure 6D:
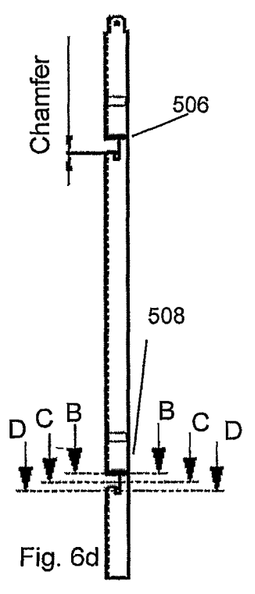
Figure 7:
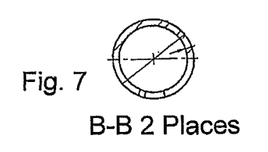
FIGS. 7 to 9 show sections through FIG. 6d.
Figure 8:
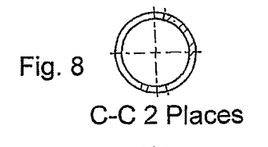
Figure 9:
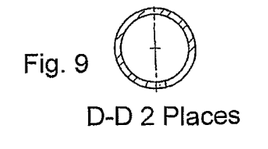

FIG. 5 shows the hydrotherapy apparatus of FIG. 4 with the conveyor 400 shown in an access position in which it is inclined about an axis that is generally parallel to its longitudinal axis. The access position gives access to an underside of the conveyor 400 to allow it to be cleaned, maintained, etc.

FIG. 5 also shows a remote control 402 which connects in a wireless manner to a controller 404 which is connected to a conveyor moving means 406. The conveyor moving means 406 comprises, in this embodiment, an electric motor that is capable of powering the conveyor with an animal exercising thereon. It will be appreciated that because the motor operates whilst submerged in water it is sealed for such operation.

Although in this embodiment the controller 404 is shown as part of the apparatus 2 is can often be convenient to mount the controller 404 on a near-by wall or other support surface. In such embodiments the controller is advantageously mounted remote from the conveyor due to the high input voltage (which could typically be 240V). It will be appreciated that it could be desirable to distance such voltages from the liquid within the tank.

In the embodiment shown the conveyor has three buttons: a speed increase button 408, a speed decrease button 410 and a stop button 412. It will be appreciated that in other embodiments there may be other functions provided on the remote and/or the remote may be provided with a wired connection to the hydrotherapy apparatus 2.

Also seen in FIG. 5 is a conveyor support means 414, 416 which is arranged to move the conveyor 400 between the working position (as shown in FIG. 4) and the access position (as shown in FIG. 5). The conveyor support means 414, 416 comprise gas assisted struts that extend to assist movement of the conveyor 400 from the working to the access position and can be compressed to allow the conveyor to move from the access to the working position. An advantage of such conveyor support means 414, 416 is that they support the conveyor when it is in the access position and therefore it cannot fall onto a person working underneath the conveyor 400. It will be appreciated that the conveyor may weigh several 10's of kilograms which would injure, perhaps severely, a person onto which it fell. In alternative, or additional embodiment it would be possible to provide powered conveyor support means 414, 416 in order to move the conveyor between the working and the access positions.

Also seen in FIGS. 4 and 5 are catches 418, 420, 422 positioned on frames against which the doors 12, 14 abut. It will be appreciated that although only 3 catches are shown there will be a fourth catch although it is obscured in the Figure. Each of the catches co-operates with a slot (only two of which 424, 426 can be seen in the Figure) a frame of one of the doors 12,14. The slots are arranged such that its respective catch passes into the slot when the door is in the closed condition.

Figure 2A:
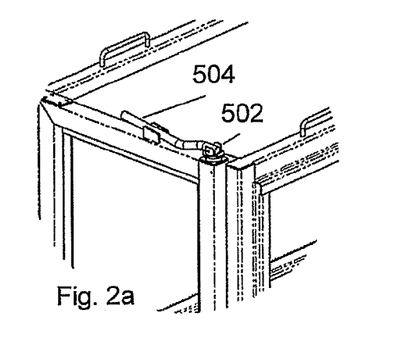
FIGS. 2a to 2e schematically show stages in the operation of a door mechanism of the hydrotherapy apparatus of FIG. 1.
Figure 2B:
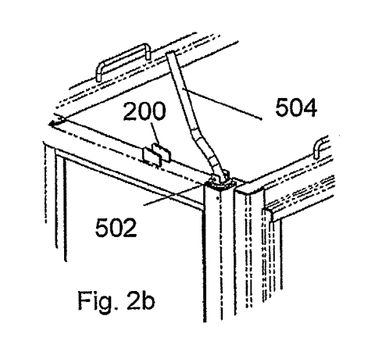
Figure 2C:
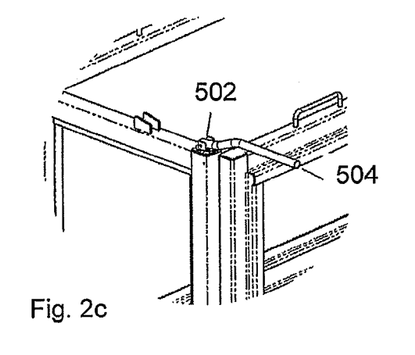
Figure 2D:
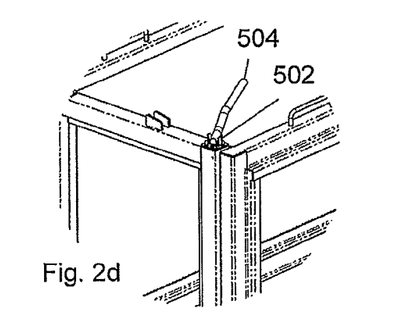
Figure 2E:
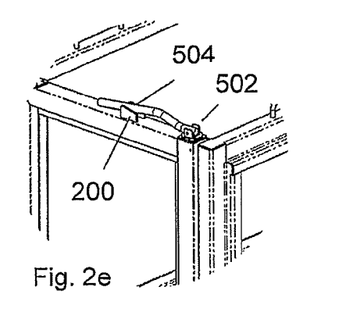
Figures 3A, 3B:
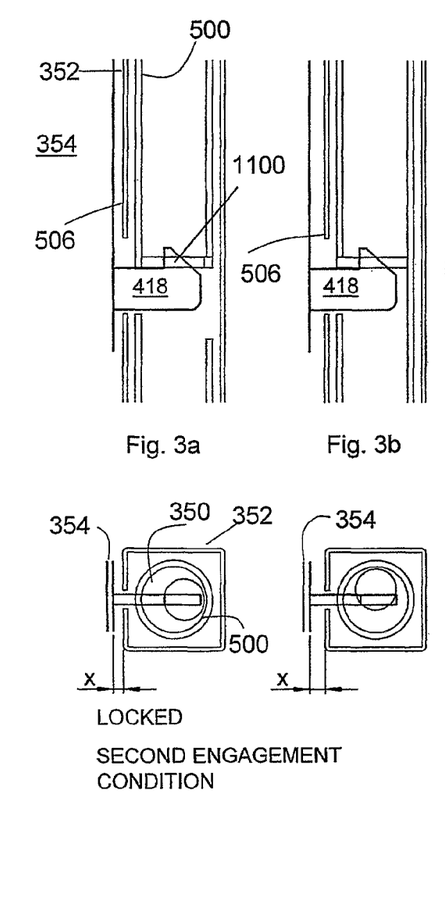
FIGS. 3a to 3e schematically show details of the inside of the door mechanism shown in FIG. 2.
Figures 3C, 3D:
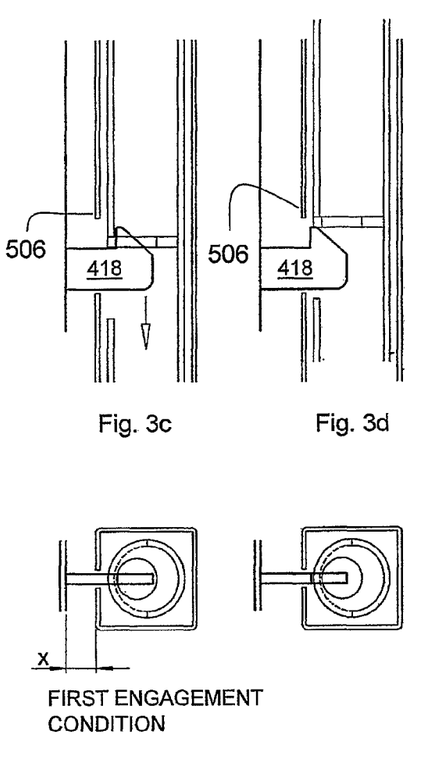
Figure 3E:
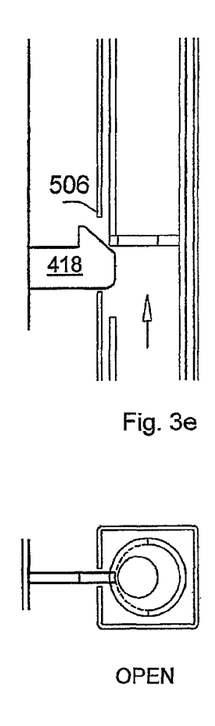

Inside the portion of the door frame in which the slots 424, 426 is provided a tubular member 500 as detailed in FIGS. 6 to 11, as shown in FIG. 3 and which provides a door closing mechanism. A top most end 502 of the tubular member extends out of the door frame and has a handle 504 pivotally attached thereto. As will be described hereinafter with reference to FIG. 2 the handle 504 allows the tubular member 500 to be rotated within the door frame and also to be moved vertically within the door frame.

The tubular member 500 has two slots 506, 508 therein which align with the slots 424, 426 in the door frame such that when a catch 418, 420, 422 passes through the slot 424, 426 in the door frame it may also pass through the slot 506, 508 into the tubular member.

A cam 350 (provided by a plate with a generally circular hole therein) acts upon a protrusion 1100 of the catch 418 as will be described hereinafter.

The slots 506 508 in the tubular member 500 are arranged such that rotation of the tubular member 500 through roughly 180° engages the catch 418-422 within the tubular member such the catch cannot be removed from the tubular member unless it is rotated back through the 180° degrees. Thus, the door mechanism can be moved from a first engagement condition in which an initial engagement is provided with the catches 418-422 and a second engagement condition in which the catches 418-422 are locked within the mechanism. The slots in the tubular member 506 508 are also arranged such that as the tubular member is rotated through 180° to trap the catches 418-422 a camming action which presses the door 12, 14 further against the frame to which it abuts. Generally a resilient material, such as a plastics material seal, is provided on the door frame against which the door abuts. The camming action of the tubular member 500 helps to draw the door 12, 14 against any such resilient material and helping to ensure a water tight seal of the door against the tank. As the tubular member 500 is rotated the shape of the slots 506 508 into which the catches 418-422 engage illustrated in positions 3a & 3b trap the catches preventing upward movement of the tube and release of the door thus preventing accidental opening of the door.

Opening of a door 12, 14 of the hydrotherapy apparatus is now described with reference to FIGS. 2 and 3. In FIGS. 2a and 3a the door has been pushed shut and the slots in both the door frame (424, 426) and the tubular member (506, 508) have received a catch 418-422 therein. It will be seen from FIG. 3a that the protrusion 1100 of the catch 418 is held by the cam 350 and the tubular member 500. For clarity a section through the door frame 352 which surrounds the tubular member and also the body 354 of the apparatus on which the catches 418-422 are also shown. Thus, in this configuration each of the catches 418-422 cannot be removed from door frame 352 and the second engagement condition is provided.

To release the or each door 12, 14 from this second engagement condition the handle 504 is lifted from its retainer 200 pivoting about its pivotal mount on the top most end 502 of the tubular member as shown in FIG. 2b. Rotation of the handle 504 continues until it has moved through an arc of roughly 180° about an axis transverse the longitudinal axis of the tubular member as shown in FIG. 2c. However, no rotation of the tubular member 500 has yet occurred and the catch 418-422 and the tubular member are still in the second engagement condition.

As can be seen in FIG. 2d the handle 504 is now used to rotate the tubular member 500 through 180° about its longitudinal axis. The resulting movement of the tubular member 500 is detailed in FIGS. 3b and 3c. FIG. 3b shows the tubular member 500 having moved through roughly 90° (i.e. the handle will be is position roughly as shown in FIG. 2d). It will be appreciated that the door frame 352 is moving away from the body 354 such a distance x therebetween increases due to the action of the cam 350 upon the protrusion 1100 on the catch.

FIG. 3c shows the tubular member after it has been rotated through 180° (i.e. the handle will be in the position as shown in FIG. 2e). The door frame 352 is now further from the body of the apparatus 354 and the door mechanism is in a first engagement condition.

FIG. 2e shows the handle 504 after it has been moved through this further arc of 180°, this time about the longitudinal axis of the tubular member. Once again the handle 504 can be retained in the retainer 200.

As shown in FIG. 3c, the catches 418-422 are still retained by the tubular member and is thus in the first engagement condition. In order that the door can be moved from the first engagement condition (in which the door is partially closed) to the open condition the tubular member 500 must be raised to allow the protrusion 1100 to be moved out of engagement with the cam 350 and such an arrangement is shown in FIG. 3d.

FIG. 3e shows the catch 418-422 out of engagement with the tubular member 500 and in which the or each door 12, 14 is then in an open condition.

It will be appreciated from the profile of the catches 418-422 (which are shown in an enlarged manner in FIG. 12) that an inclined face 1102 thereof will contact the tubular member 500 and raise it allowing the protrusion 1100 to enter the cam 350 when the door is pushed from the open condition to the first engagement condition. As such to shut the door 12, 14 a user simply needs to push the door 12, 14 to and then reverse movement of the handle 504 as described above.

Figures 10, 12:
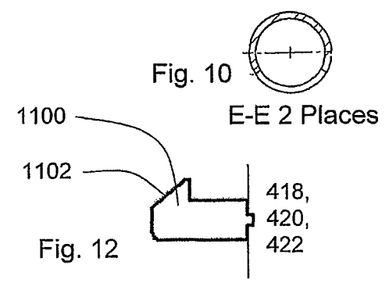
FIGS. 10 and 11 show sections through FIG. 6b.
FIG. 12 shows an enlargement of a catch for a door of an embodiment of the present invention.
Figure 11:
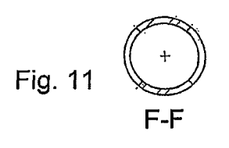

As will be appreciated from FIGS. 10 and 11 the shape of the slots 506, 508 in the tubular member 500 are such that when the mechanism is in the second engagement condition the tubular member 500 cannot be moved vertically relative to the catches 418-422 and therefore, the catch 418-422 cannot be removed door frame 352. It will be seen in FIGS. 3a and 3b that the underside of the catch 418-422 is in close proximity or rests on the tubular member 500. In FIG. 3c it will be seen that the gap between the underside of the catch 418-422 and the tubular member is greater allowing the tubular member 500 to be moved vertically relative to the catch 418-422.

It should be noted that in FIG. 2a the handle 504 is upwardly curved (i.e. presents itself in a first condition), whereas in FIG. 2e the handle 504 is downwardly curved (i.e. presents itself in a second condition). Such an arrangement is convenient because it provides an easy reference as to whether the catch 418-422 and the tubular member 500 are in the first or second engagement condition. It will be appreciated that other handle shapes are equally possible but it is convenient for the handle to marked and/or shaped such that a user can determine the position of the door closing mechanism.

Figure 13:
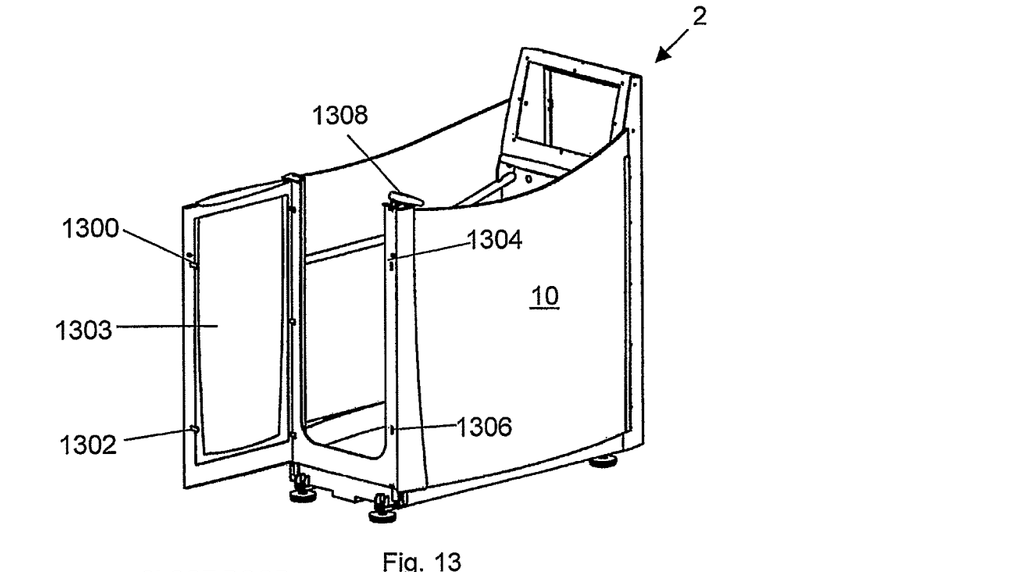
FIG. 13 shows an alternative embodiment of the invention in which the door closing mechanism is arranged in an alternative manner.

The embodiment shown in FIG. 13 provides catches 1300, 1302 are provided on a door 1303 rather on a frame 1306 against which the door abuts. The frame has complementary slots 1304, 1306 in which the catches 1300, 1302 are arranged to engage when the door is in a closed condition.

In the embodiment described in FIGS. 13 and 14 the door closing mechanism is provided in the frame 1306 against which the door abuts rather than in a frame of the door as described in relation to the other Figures. Thus, it will be seen that a handle 1308, to activate the door closing mechanism, is provided above the frame 1306.

FIG. 14 details the functionality of the door closing mechanism as shown in FIG. 13 which functions in a largely similar manner to the mechanism shown in FIG. 3 but the mechanism has been turned up side down.

Figures 14A, 14B, 14C:
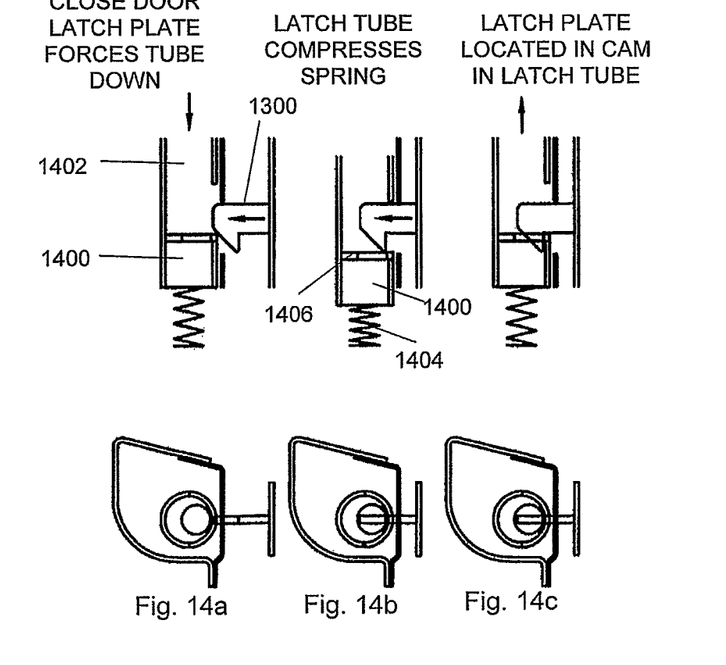
FIG. 14 schematically shows details of the inside of the door mechanism shown in FIG. 13.

Thus, FIG. 14a shows the door in an open position about to be closed. A tubular member 1400 having a cam 1402 associated therewith abuts a catch 1300.

Action of a sloping surface of the catch 1300 pushes the tubular member 1400 in a downward direction against the force of a biasing means 1404 (as shown in FIG. 14b). In this embodiment the biasing means is provided by a compressive helical spring, although other biasing means such as tension springs, or torsion springs, or the like could also be utilised.

Thus, the catch 1300 engages a hole 1406 within the cam 1402 allowing the tubular member 1400 to rise due to the force exerted by the biasing means 1404 as shown in FIG. 14c.

Figures 14D, 14E, 14F:
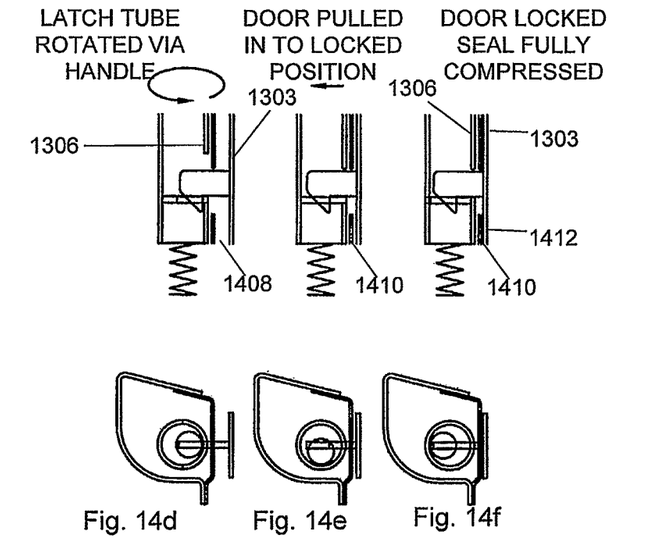

In order to securely latch the door 1303 in place the handle 1308 is rotated, thus causing the tubular member 1400 to rotate causing the cam 1402 to exhibit a camming action on the catch 1300. This is represented in FIGS. 14d, 14e and 14f. In FIG. 14d a gap 1408 can be seen between the door 1300 and the frame 1306 (i.e. when the door closing mechanism is in a first engagement condition). As can be seen in FIG. 14f (when the door is in a second engagement condition), there is no gap 1410 and a seal 1412 is compressed between the door 1303 and the frame 1306; the reduction of the gap 1408 being caused by the camming action caused by rotation of the cam 1402.

Figures 14G, 14H, 14I:
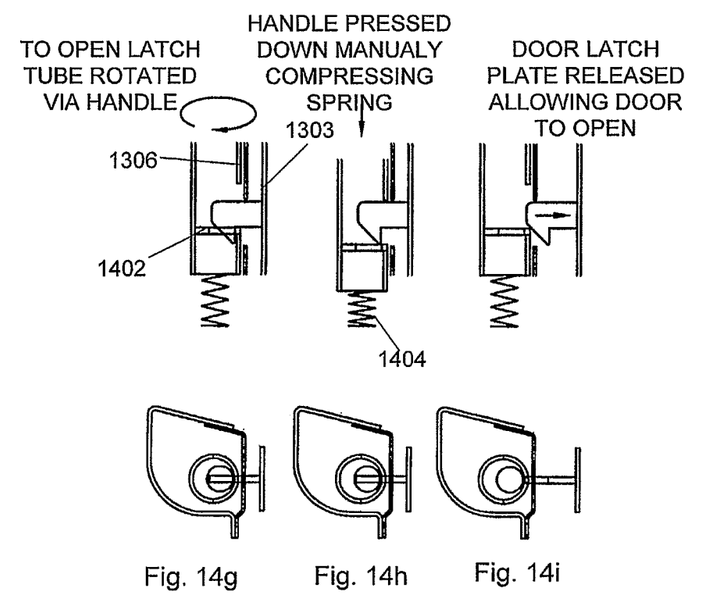

FIG. 14g represents how the door 1303 is opened. The handle 1308 is rotated, in this example in an opposite manner in which it was moved to shut the door 1300, so that door 1303 is forced to move away from the frame 1306 due to the camming action of the cam 1402.

The handle 1308 is then pressed in a downwards direction, thus compressing the biasing means 1404 allowing the catch 1300 to become disengaged from the cam 1402, as shown in FIG. 14h. Once the catch 1300 has become disengaged from the cam 1402 the door 1303 can be opened as shown in FIG. 14l.

Figure 15:
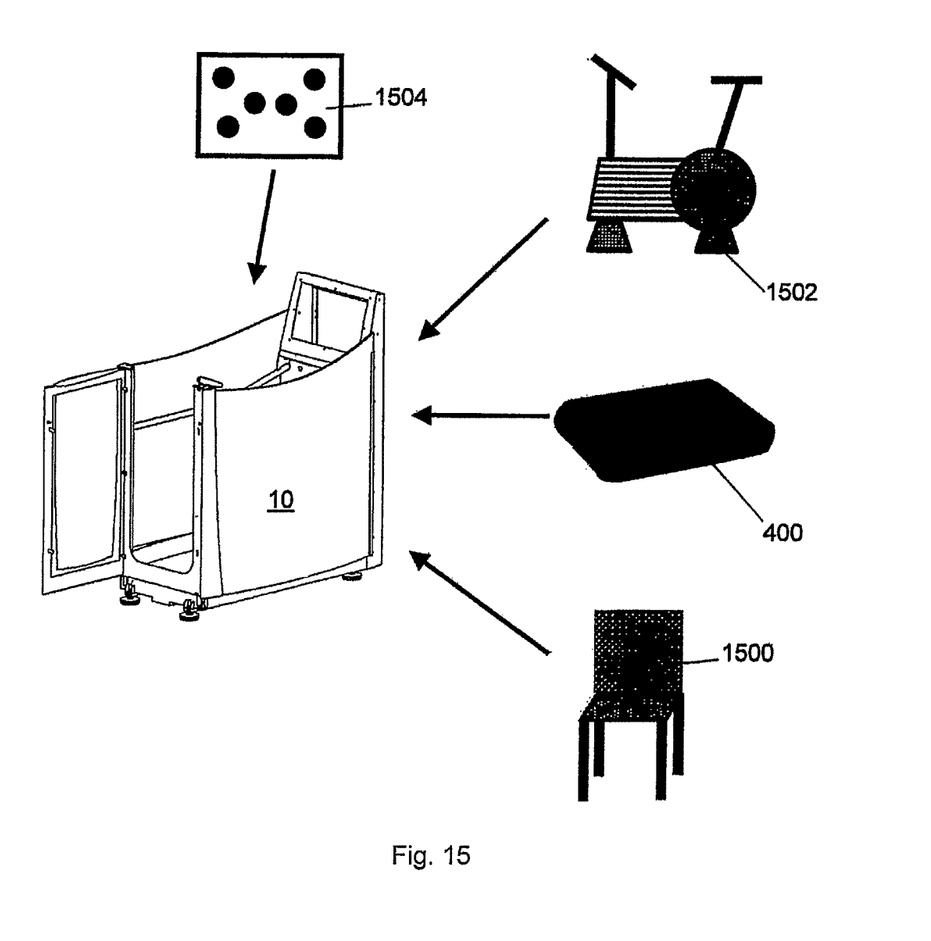
FIG. 15 shows the various components that may be installed within any of the embodiments of the hydrotherapy apparatus.

FIG. 15 shows the hydrotherapy apparatus of any of the above embodiments provided with a plurality of accessories, each of which may be installed within the apparatus.

The conveyor 400 described in any of the above embodiments may or may not be removed before the accessory is installed. That is in some embodiments the treadmill may be left in situ whilst the accessory is installed above the conveyor.

One example of an accessory is a chair 1500 allowing a patient to sit within the hydrotherapy apparatus. The accessory may comprise an exercise bike 1502 allowing a patient to cycle within the hydrotherapy apparatus.

The accessory may comprise one or more jets 1504 arranged to convert the apparatus into a spa. Jets 1504 may be provided in association with a chair 1500, exercise bike 1502 or indeed with the conveyor 400. Jets 1504 may be arranged to increase the resistance of a user on the conveyor 400.

The hydrotherapy apparatus may have an engagement means arranged to locate the accessory within the apparatus. The engagement means may comprise a locking means which must be released, once engaged, in order to release the accessory from the apparatus. For example, the locking means may comprise a biased lever which must be retracted in order to release the accessory.

The accessories described in relation to FIG. 15 may have a moving means arranged to move an element of the accessory or the liquid within the hydrotherapy apparatus. For example, the jets may comprise a pump in order to pump fluid.

The hydrotherapy apparatus described herein will generally all be capable of having, or have, a conveyor in a bottom region thereof.

The invention claimed is:

1. A hydrotherapy apparatus, wherein the apparatus comprises:
   at least one door operable between an open condition providing access to an interior of the apparatus and a closed condition preventing access to the interior of the apparatus and forming a tank, arranged, in use, to contain a volume of liquid at the interior of the apparatus and wherein the at least one door is arranged to swing about a vertical axis in a direction away from the interior of the apparatus to achieve the open condition and provide access to the interior of the apparatus;
   a door closing mechanism having a first engagement condition and a second engagement condition wherein movement of the door closing mechanism from the first engagement condition to the second engagement condition draws the door against a frame to which it abuts;
   wherein the door closing mechanism comprises at least one tubular member having one or more slots therein and rotation of the at least one tubular member moves the door closing mechanism from the first engagement condition to the second engagement condition, the door closing mechanism be provided in association with one of:
      i) a frame of the at least one door in a region arranged to move away from the formed tank when the at least one door is in the open condition; and
      ii) a portion of the tank in a region at which the at least one door is arranged to move away from when the at least one door is in the open condition;
   wherein the apparatus further comprises a door release handle provided on a top periphery of the apparatus arranged such that rotation of the door release handle causes rotation of the at least one tubular member thereby moving the door closing mechanism from the first engagement condition to the second engagement condition;
   wherein the door closing mechanism is arranged such that movement of the at least one tubular member along a longitudinal axis thereof allows a catch to be released from the door closing mechanism; and
   a biasing means that comprises a spring and is arranged to bias the at least one tubular member to a longitudinal position in which the catch is not releasable from the door closing mechanism.

2. A hydrotherapy apparatus according to claim 1, wherein a watertight seal is provided between the door and frame.

3. A hydrotherapy apparatus according to claim 1, wherein a resilient material is provided and arranged to provide a watertight seal between the door and the frame to which it abuts when the door closing mechanism is in the second engagement condition.

4. A hydrotherapy apparatus according to claim 3, wherein the resilient material is compressed by the door as the door closing mechanism moves from the first engagement condition to the second engagement condition.

5. A hydrotherapy apparatus according to claim 1, wherein the at least one tubular member is circular in cross section.

6. A hydrotherapy apparatus according to claim 1, wherein the door release handle is pivotally attached to the at least one tubular member.

7. A hydrotherapy apparatus according to claim 1, wherein the door closing mechanism is provided with a cam arranged to draw the door closed as the mechanism is moved from the first engagement condition to the second engagement condition.

8. A hydrotherapy apparatus according to claim 7, wherein the cam comprises an off-center hole in a plate, receiving a protrusion on a catch.

9. A hydrotherapy apparatus according to claim 7, wherein the cam rotates as the door closing mechanism moves from the first engagement condition to the second engagement condition.

10. A hydrotherapy apparatus according to claim 7, wherein rotation of the at least one tubular member causes the cam to rotate.

11. A. hydrotherapy apparatus according to claim 7, wherein the at least one tubular member and the cam have fixed orientations relative to one another.

12. A hydrotherapy apparatus according to claim 1, wherein one of the door and the frame against which the door abuts includes the catch and the door closing mechanism latches the catch when in the first engagement condition.

13. A hydrotherapy apparatus according to claim 12, wherein the door closing mechanism locks the catch within the door closing mechanism when in the second engagement condition.

14. A hydrotherapy apparatus according to claim 1, wherein the apparatus includes multiple sidewalls generally defining its perimeter and one or more floats are provided such that, in use, when the tank is filled with a liquid, the one or more floats float at a surface region of the liquid adjacent the side walls of the tank.

15. A hydrotherapy apparatus according to claim 1, comprising further a conveyor therein.

16. A hydrotherapy apparatus according to claim 15 further comprising a remote control that is configured to operate the conveyor.

17. A hydrotherapy apparatus according to claim 15, wherein the conveyor has a working position in which its surface is substantially horizontal or inclined about an axis generally traverse its longitudinal axis, and an access position in which it is inclined about an axis generally parallel to its longitudinal axis.

18. A hydrotherapy apparatus according to claim 6, wherein the door release handle is arranged to present itself in a first condition when the door closing mechanism is in the first engagement condition and to present itself in a second condition when the door closing mechanism is in the second engagement condition.

19. A hydrotherapy apparatus according to claim 1, wherein the door release handle is arranged to present itself in a first condition when the door closing mechanism is in the first engagement condition with the tubular member in a first axial position and to present itself in a second condition when the door closing mechanism is in the second engagement condition with the tubular member in a second axial position.

20. A hydrotherapy apparatus according to claim 13 wherein the at least one tubular member contains a slot arranged to receive the catch, wherein the slot is arranged such that when in the first engagement condition the tubular member is able to move along its longitudinal axis relative to the catch and when in the second engagement condition the tubular member is prevented from moving along its longitudinal axis relative to the catch.

21. A hydrotherapy apparatus comprising:
at least one door operable between an open condition providing access to an interior of the apparatus and a closed condition preventing access to the interior of the apparatus and forming a tank, arranged, in use, to contain a volume of liquid at the interior of the apparatus and wherein the at least one door is arranged to swing about a vertical axis in a direction away from the interior of the apparatus to achieve the o en condition and provide access to the interior of the apparatus;
a door closing mechanism having a first engagement condition and a second engagement condition wherein movement of the door closing mechanism from the first engagement condition to the second engagement condition draws the door against a frame to which it abuts;
wherein the door closing mechanism comprises at least one tubular member having one or more slots therein and rotation of the at least one tubular member moves the door closing mechanism from the first engagement condition to the second engagement condition, the door closing mechanism be provided in association with one of:
i) a frame of the at least one door in a region arranged to move away from the formed tank when the at least one door is in the open condition; and
ii) a portion of the tank in a region at which the at least one door is arranged to move away from when the at least one door is in the open condition;
wherein the apparatus is further comprises a door release handle provided on a top periphery of the apparatus arranged such that rotation of the door release handle causes rotation of the at least one tubular member thereby moving the door closing mechanism from the first engagement condition to the second engagement condition; and
wherein the door closing mechanism comprises two tubular members, each containing at least one slot arranged to receive a catch provided on one of the door and a frame to which the door abuts.

22. A hydrotherapy apparatus according to claim 21 wherein one of the two tubular members comprises a cam and the other of the tubular members comprises a slot arranged to receive a catch on one of the door and frame against which the door abuts which is arranged to be moved to control longitudinal movement of the other tubular member relative to the cam.

* * * * *

UNITED STATES PATENT AND TRADEMARK OFFICE
CERTIFICATE OF CORRECTION

| | | |
|---|---|---|
| PATENT NO. | : 8,667,622 B2 | Page 1 of 1 |
| APPLICATION NO. | : 11/815951 | |
| DATED | : March 11, 2014 | |
| INVENTOR(S) | : Christopher John Truman and Matthew William Rees | |

It is certified that error appears in the above-identified patent and that said Letters Patent is hereby corrected as shown below:

Title Page, Item (73) Assignee:

Delete "Syspal Limited" and substitute therefore -- Syspal Holdings Ltd. --.

Signed and Sealed this
Eighteenth Day of November, 2014

Michelle K. Lee
*Deputy Director of the United States Patent and Trademark Office*